Jan. 14, 1941.　　　　P. E. MERCIER　　　　2,228,637
EXHAUST CONDUIT FOR AIRCRAFT AND COOLING SYSTEM THEREFOR
Filed March 23, 1938　　　2 Sheets-Sheet 1
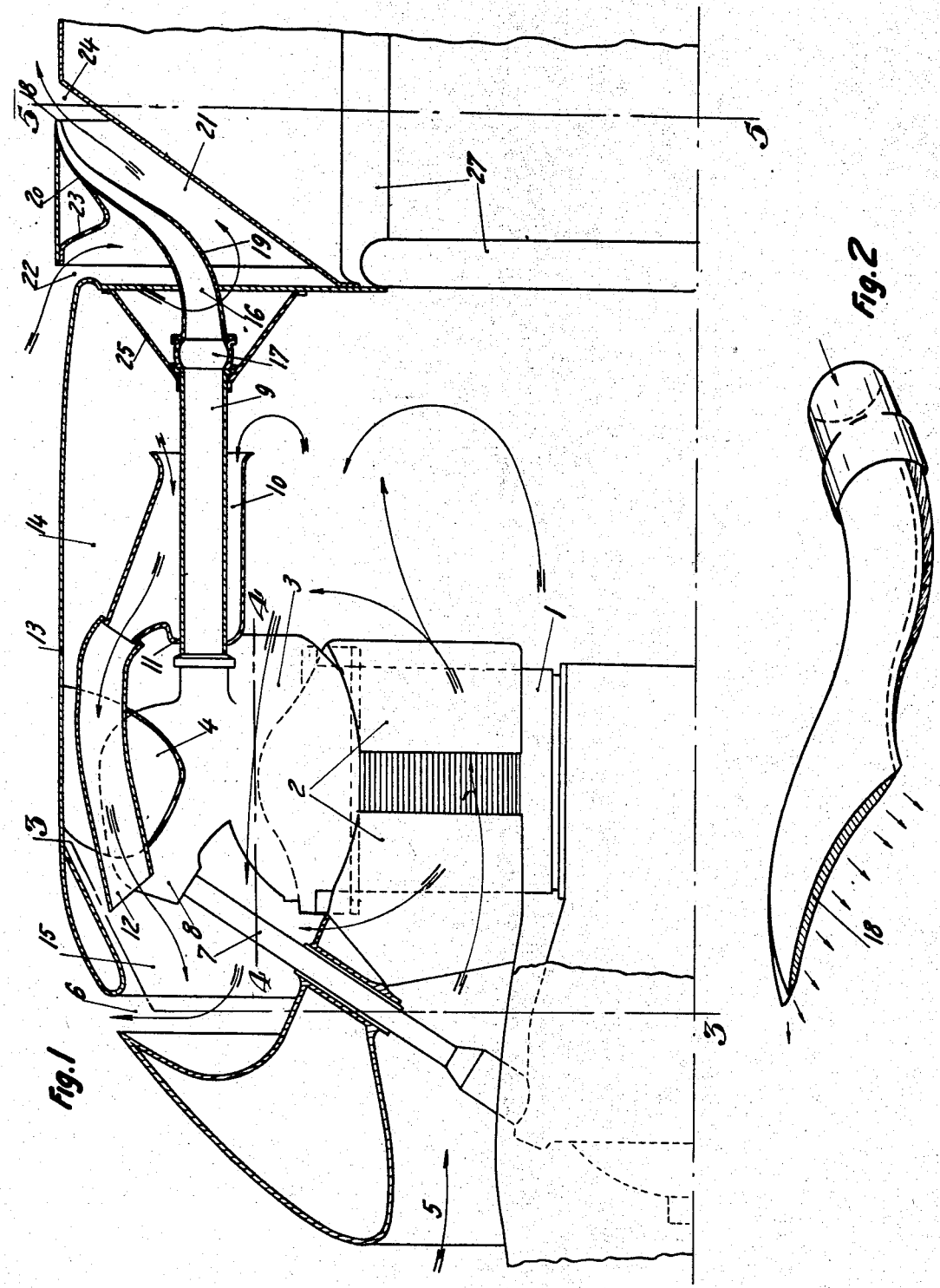
INVENTOR:
PIERRE ERNEST MERCIER
BY Haseltine, Lake & Co.
ATTORNEYS Jan. 14, 1941.    P. E. MERCIER    2,228,637
EXHAUST CONDUIT FOR AIRCRAFT AND COOLING SYSTEM THEREFOR
Filed March 23, 1938    2 Sheets-Sheet 2
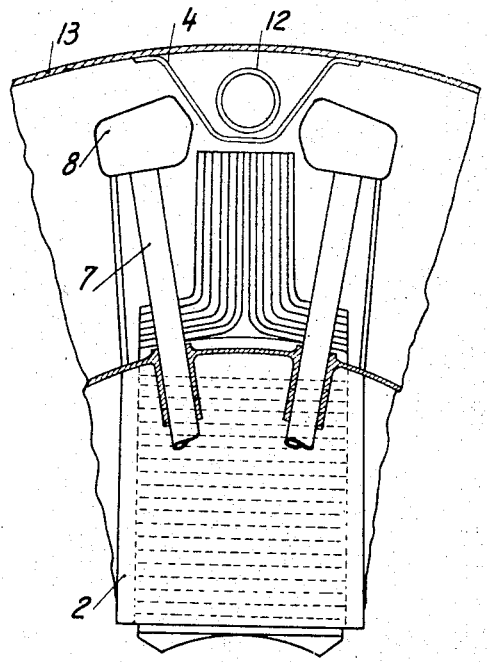
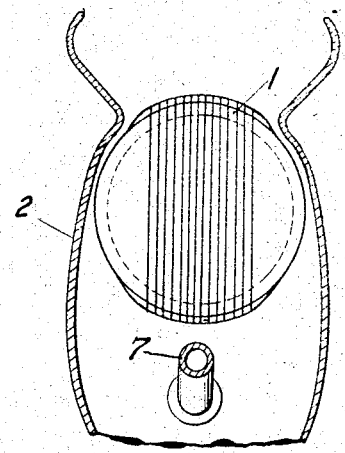
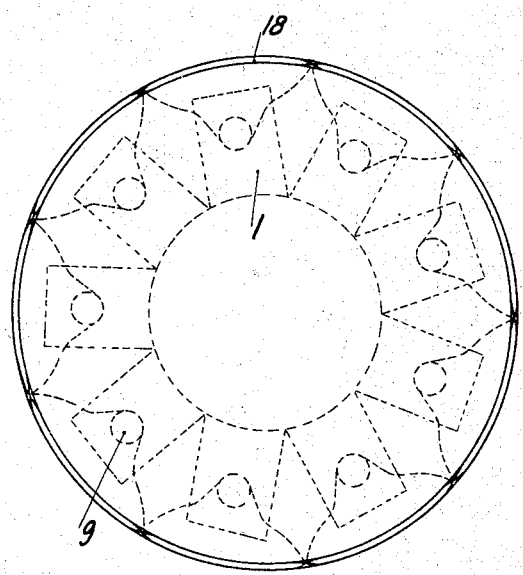
INVENTOR:
PIERRE ERNEST MERCIER
BY Haseltine, Lake & Co
ATTORNEYS

UNITED STATES PATENT OFFICE 2,228,637

EXHAUST CONDUIT FOR AIRCRAFT AND COOLING SYSTEM THEREFOR

Pierre Ernest Mercier, Paris, France

Application March 23, 1938, Serial No. 197,584
In France December 24, 1937

5 Claims. (Cl. 60—31)

This invention relates to exhaust conduits for aircraft engines and cooling systems therefor, and has for its object to provide means which will tend to ensure flame suppression at the level of the exhaust.

According to the invention the exhaust gases are brought into contact with a cooling medium along a predetermined surface obtained by a particular formation of the exhaust conduit. The exhaust conduit may have a widened portion combined with a flattened portion, whereby the cross-section available for the flow of exhaust gases is maintained constant or increases slightly towards the outlet end of the exhaust conduit.

In order that the gases will flow to the exterior of the cowling and will be discharged in the direction of the thin streams of air travelling along the cowling, the conduit also comprises, in a plane perpendicular to that of the said flattening, two successive opposite bends.

In addition thereto, there is concentrically disposed about the exhaust conduit a cylindrical jacket in which a circulation of air is so set up that the air which has cooled the conduit (the temperature of which is high) cannot subsequently pass, before being discharged from the cowling, to other parts of the engine which are at lower temperature and which also require cooling.

The particular form of the exhaust pipe according to the above feature of the invention may advantageously be combined with a circulation of cooling air peculiar to the exhaust conduit or conduits disposed, if necessary, in a special compartment, the outlet for the said cooling air being disposed below the outlet lip of the exhaust conduit according to the invention with the object of withholding the exhaust gases from the surface of the cowling by the interposition of this layer of cooling air.

In the accompanying drawings,

Figure 1 shows diagrammatically and in longitudinal section a cowling having a return circulation of the cooling air and embodying the invention, and Figure 2 shows, in perspective, the exhaust pipe included in Figure 1.

Figure 3 is a section on line 3—3 in Figure 1.

Figure 4 is a diagrammatic view of the cylinder and deflectors of the apparatus in section as taken on line 4—4 of Figure 1, while Figure 5 is also a section of Figure 1 on line 5—5 when the construction is modified so that the lips 18 join to form a continuous slot if the associated engine is assumed to have nine cylinders.

Throughout the views the same reference numbers indicate same or corresponding parts.

In Figure 1, the nose piece of the engine is 5 shown on the left. One cylinder of the engine is indicated at 1 and is provided with cooling fins and deflectors 2 which guide the cooling air through the fins and cause this air to be discharged towards the cylinder head 3 provided with a deflector 4. The partitioning is such that cooling air entering at 5 is guided in the direction of the arrows shown in the drawings, its direction of circulation being reversed after it has cooled the cylinders, so that the thin streams of air escape through a slot 6 situated near the front of the engine after having traversed the cylinder head.

One of the rocker rods is shown at 7, and the casing of the admission rocker at 8, though these members are not essential to the understanding of the invention. The exhaust conduit is shown at 9, and is arranged in a jacket 10, which terminates on the right with a flared mouth as shown, and is closed at 11 by an annular partition fitted on the conduit 9. The piping which completes the jacket is shown at 12. The deflector 4 combined with the outer wall 13 of the cowling separates two zones under different pressures. Thus, between the spaces 14 and 15 situated in the two zones there is a difference of pressure which is due to the arrangement of the cowling and ensures the passage of the air over the fins of the cylinder head 3, that is to say, from right to left in the figure. This pressure difference ensures the flow of air through the jacket 10 and the conduit 12 connected thereto.

The exhaust conduit 9 has an extension 16 connected thereto by a ball joint 17 and leading to the atmosphere at 18 after having described two bends of opposite direction 19 and 20. The extension 16 is disposed in a compartment 21, which may be annular, for example in the case of a radial engine, and is fed with cooling air through a feed slot 22. A baffle plate 23 causes the air to pass under the extension 16 and then to leave in sheet form at 24 under the lower outlet lip of the pipe 18. A sleeve 25 of truncated cone shape separates the extension 16 from the space 14 containing the cooling air of the engine.

Figure 2 is a diagrammatic representation of the exhaust pipe. The outlet 18 is curved in a manner corresponding to that of the adjacent part of the cowling. The whole is suspended on the spars 27, which constitute part of the frame of the aircraft.

Figures 1 and 2 of the accompanying drawings show, by way of example, the application of the invention to a cylinder head which is cooled by a current of air flowing in the opposite direction to that of the exhaust gases flowing out through the exhaust conduit. This is the case, for example, with the cowling forming the subject of the Patent No. 2,206,417 issued on July 2, 1940, the exhaust conduits being situated behind the engine.

In this type of cowling difficulties may arise due to the fact that the air for cooling the cylinder head must first pass over the exhaust conduits. Even when the exhaust conduits are disposed in a separate compartment, which is advisable, the cooling of the exhaust conduits in the neighborhood of the cylinder heads is a difficult problem which, however, is met by the arrangements according to the invention.

The sectional and diagrammatic views shown in Figures 3 and 4 illustrate the position of the deflectors 2 and 4 in relation to the engine.

It will be understood that it is possible without departing from the invention, for example, to couple together the exhaust pipes of adjacent cylinders, and if necessary to combine their outlet apertures so as to form a continuous aperture on the surface of the cowling.

An example of such construction is illustrated in the modification of Figure 5, which while being drawn as a section of Figure 1 nevertheless reveals the feature of having the lips 18 join to form a continuous slot for an associated engine having nine cylinders.

What I claim as my invention and desire to secure by Letters Patent of the United States is:

1. In an aircraft engine provided with an exhaust pipe lodged with a cowling, the feature of having the cross-section of said exhaust pipe progressively flattened as it extends from the cylinder towards the outlet end whilst the longitudinal axis of the conduit describes two successive opposite bends in a plane perpendicular to that of the said flattening, the direction of this longitudinal axis at the outlet end of the pipe causing the exhaust gases to escape substantially parallel to the exterior surface of said cowling, and means for passing a current of air between said outlet and said cowling.

2. In an aircraft engine provided with an exhaust pipe lodged with a cowling, the feature of having the cross-section of said exhaust pipe progressively flattened as it extends from the cylinder towards the outlet end, this flattened section being constant, whilst the longitudinal axis of the conduit describes two successive opposite bends in a plane perpendicular to that of the said flattening, the direction of this longitudinal axis at the outlet of the pipe causing the exhaust gases to escape substantially parallel to the exterior surface of said cowling, and means for passing a current of air between said outlet and said cowling.

3. In an aircraft engine provided with an exhaust conduit, the feature of having the cross-section of said exhaust conduit flattened progressively as it extends from the cylinder towards the outlet end of the pipe, this section increasing slightly towards the said outlet, while the longitudinal axis of the conduit describes two successive opposite bends in a plane perpendicular to that of the said flattening, the direction of this axis at the outlet end of the conduit causing the exhaust gases to escape substantially parallel to the exterior surface of said cowling, and means for passing a current of air between said outlet and said cowling.

4. In an aircraft provided with an engine, an inwardly curved cowling therefor, and an exhaust pipe, the feature which consists in having the cross-section of the exhaust pipe progressively flattened as it extends from the engine cylinder towards the outlet end of the conduit, while the longitudinal axis of the conduit describes two successive opposite bends in a plane perpendicular to that of the said flattening, the direction of this longitudinal axis at the outlet end of the conduit causing the gases of the engine to escape substantially parallel to the exterior surface of said cowling, and means for passing a current of air between said outlet and said cowling, the said outlet opening being in the form of an inwardly curved slot whose curvature corresponds to that of the said cowling.

5. In an aircraft provided with a multi-cylinder engine, and an exhaust conduit for each cylinder and a cowling for said engine, the feature of having the cross-section of the conduit of each cylinder progressively flattened as it extends from the cylinder towards the outlet end of the conduit whose longitudinal axis describes two successive opposite bends in a plane perpendicular to that of the said flattening, the direction of this longitudinal axis at the outlet end of the conduit causing the exhaust gases to escape substantially parallel to the exterior surface of said cowling, and means for passing a current of air between said outlet and said cowling, the outlet openings of the several exhaust conduits having the form of inwardly curved slots which are combined into the form of a continuous annular slot for the discharge of the exhaust gases from all the cylinders.

PIERRE ERNEST MERCIER.